United States Patent
Fernando et al.

(10) Patent No.: US 10,673,479 B2
(45) Date of Patent: Jun. 2, 2020

(54) RANGE-BASED TRANSMISSION PARAMETER ADJUSTMENT

(71) Applicant: Qualcomm Incorporated, San Diego, CA (US)

(72) Inventors: Udara Fernando, San Diego, CA (US); Sang-June Park, San Diego, CA (US); Shrenik Patel, San Diego, CA (US); Roberto Rimini, San Diego, CA (US); Steven Charles Ciccarelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/938,813

(22) Filed: Mar. 28, 2018

(65) Prior Publication Data
US 2018/0287651 A1 Oct. 4, 2018

Related U.S. Application Data

(60) Provisional application No. 62/477,933, filed on Mar. 28, 2017.

(51) Int. Cl.
*H04B 1/3827* (2015.01)
*H04B 17/10* (2015.01)
(Continued)

(52) U.S. Cl.
CPC .......... *H04B 1/3838* (2013.01); *G01S 13/343* (2013.01); *G01S 13/345* (2013.01);
(Continued)

(58) Field of Classification Search
CPC .......... H04B 1/3838; H04B 1/401–408; H04B 1/005; H04B 1/0071; G01S 13/84; G01S 17/10–107
(Continued)

(56) References Cited

U.S. PATENT DOCUMENTS 4,384,291 A * 5/1983 Lewis ............... G01S 13/286
342/194
4,510,595 A * 4/1985 Glance ................ H04B 1/50
370/278
(Continued)

FOREIGN PATENT DOCUMENTS

WO 2008058770 A1 5/2008

OTHER PUBLICATIONS

"International Search Report and Written Opinion", PCT Application No. PCT/US2018/024960, dated Aug. 27, 2018, 22 pages.
(Continued)

*Primary Examiner* — Edward F Urban
*Assistant Examiner* — Rui M Hu
(74) *Attorney, Agent, or Firm* — Colby Nipper / Qualcomm

(57) ABSTRACT

An apparatus is disclosed for range-based transmission parameter adjustment. In an example aspect, the apparatus includes a first antenna, a second antenna, and a wireless transceiver. The wireless transceiver is coupled to the first antenna and the second antenna. The wireless transceiver is configured to transmit a proximity detection signal via the first antenna. The wireless transceiver is also configured to receive a reflected proximity detection signal via the second antenna. The reflected proximity detection signal including a portion of the proximity detection signal that is reflected by an object. The wireless transceiver is additionally configured to adjust a transmission parameter based on the reflected proximity detection signal. The transmission parameter varies according to a range to the object. The wireless transceiver is further configured to transmit an uplink signal using the transmission parameter.

30 Claims, 9 Drawing Sheets

(51) Int. Cl.
  *H01Q 1/24* (2006.01)
  *H04B 17/27* (2015.01)
  *H04B 7/06* (2006.01)
  *H04W 52/28* (2009.01)
  *G01S 13/34* (2006.01)
  *G01S 13/86* (2006.01)
  *G01S 13/88* (2006.01)
  *H04W 16/28* (2009.01)
  *H04W 72/04* (2009.01)
  *H04W 52/14* (2009.01)

(52) U.S. Cl.
  CPC ............ *G01S 13/86* (2013.01); *G01S 13/88* (2013.01); *H01Q 1/245* (2013.01); *H04B 7/0617* (2013.01); *H04B 7/0695* (2013.01); *H04B 17/103* (2015.01); *H04B 17/27* (2015.01); *H04W 52/283* (2013.01); *H04W 16/28* (2013.01); *H04W 52/146* (2013.01); *H04W 72/0413* (2013.01)

(58) Field of Classification Search
  USPC ......... 455/552, 553, 552.1, 553.1, 41.1–41.3
  See application file for complete search history.

(56) References Cited

U.S. PATENT DOCUMENTS

| | | | | |
|---|---|---|---|---|
| 5,231,632 | A * | 7/1993 | Yamao | H04W 88/02 370/331 |
| 5,274,380 | A * | 12/1993 | Yatsuka | G01S 7/023 342/100 |
| 5,337,005 | A * | 8/1994 | Fenk | H04B 1/403 327/105 |
| 5,381,444 | A * | 1/1995 | Tajima | G01S 13/762 342/118 |
| 5,521,600 | A * | 5/1996 | McEwan | A61B 5/0507 342/27 |
| 5,640,694 | A * | 6/1997 | Milton, Jr. | G01S 7/021 342/57 |
| 5,657,326 | A * | 8/1997 | Burns | H04L 12/413 370/349 |
| 5,708,436 | A * | 1/1998 | Loiz | G01S 13/86 342/161 |
| 5,892,477 | A * | 4/1999 | Wehling | G01S 7/352 342/18 |
| 5,896,562 | A * | 4/1999 | Heinonen | H03D 7/165 455/552.1 |
| 5,983,081 | A * | 11/1999 | Lehtinen | H03J 5/0281 455/179.1 |
| 6,310,863 | B1 * | 10/2001 | Yamamoto | H04B 1/0003 370/281 |
| 6,362,777 | B1 * | 3/2002 | Kawakami | G01S 7/28 342/104 |
| 6,449,264 | B1 * | 9/2002 | Lehtinen | H04B 1/0071 370/328 |
| 6,487,219 | B1 * | 11/2002 | Snider | H04J 3/12 370/478 |
| 6,587,072 | B1 * | 7/2003 | Gresham | G01S 7/282 342/25 R |
| 6,704,549 | B1 * | 3/2004 | Sorrells | H03D 7/00 455/102 |
| 7,492,311 | B2 * | 2/2009 | Kurata | G01S 7/282 342/134 |
| 8,638,819 | B2 * | 1/2014 | Chen | H04B 1/0057 370/280 |
| 8,755,834 | B2 * | 6/2014 | Vaisanen | H04B 1/0057 455/552.1 |
| 8,781,420 | B2 | 7/2014 | Schlub et al. | |
| 8,781,422 | B2 * | 7/2014 | Tanii | H04L 27/12 455/205 |
| 8,994,586 | B1 * | 3/2015 | Choi | G01S 13/584 342/109 |
| 9,176,223 | B2 | 11/2015 | Derham et al. | |
| 9,179,299 | B2 | 11/2015 | Schlub et al. | |
| 9,474,042 | B1 | 10/2016 | Wootton et al. | |
| 9,547,070 | B2 | 1/2017 | Corcos et al. | |
| 10,097,287 | B1 * | 10/2018 | Schat | G01S 7/354 |
| 10,305,611 | B1 | 5/2019 | Rimini et al. | |
| 10,389,414 | B1 | 8/2019 | Qi et al. | |
| 2002/0003488 | A1 * | 1/2002 | Levin | G01S 7/023 342/70 |
| 2002/0128052 | A1 * | 9/2002 | Neagley | G01S 13/756 455/575.1 |
| 2004/0214598 | A1 * | 10/2004 | Parameswaran Rajamma | G01S 13/04 455/556.1 |
| 2005/0225481 | A1 * | 10/2005 | Bonthron | G01S 7/032 342/175 |
| 2005/0242984 | A1 | 11/2005 | Waters | |
| 2006/0012511 | A1 * | 1/2006 | Dooi | G01S 7/02 342/70 |
| 2006/0071790 | A1 * | 4/2006 | Duron | G01S 13/75 340/572.1 |
| 2006/0199587 | A1 * | 9/2006 | Hansen | H04B 15/02 455/442 |
| 2006/0220944 | A1 * | 10/2006 | Ikeda | G01S 7/28 342/70 |
| 2006/0234635 | A1 | 10/2006 | Riordan et al. | |
| 2007/0085728 | A1 * | 4/2007 | Matsuoka | G01S 7/4004 342/70 |
| 2007/0188373 | A1 * | 8/2007 | Shirakawa | H01Q 21/062 342/70 |
| 2007/0202812 | A1 | 8/2007 | Park et al. | |
| 2008/0018526 | A1 * | 1/2008 | Wade | G01S 7/28 342/204 |
| 2008/0233954 | A1 * | 9/2008 | Ibrahim | H03L 7/085 455/434 |
| 2008/0297487 | A1 * | 12/2008 | Hotelling | G06F 1/3203 345/173 |
| 2009/0080501 | A1 * | 3/2009 | Kim | G01S 13/82 375/211 |
| 2011/0075593 | A1 * | 3/2011 | Chen | H04B 1/0057 370/280 |
| 2011/0140949 | A1 | 6/2011 | Lee | |
| 2011/0250928 | A1 * | 10/2011 | Schlub | H01Q 1/243 455/550.1 |
| 2011/0292988 | A1 * | 12/2011 | Szajnowski | H04B 1/1027 375/227 |
| 2011/0309971 | A1 * | 12/2011 | Kanamoto | G01S 3/74 342/147 |
| 2013/0162465 | A1 * | 6/2013 | Mukai | G01S 7/282 342/195 |
| 2013/0172045 | A1 | 7/2013 | Caballero et al. | |
| 2014/0064264 | A1 | 3/2014 | Morita et al. | |
| 2014/0292562 | A1 * | 10/2014 | Subramanian | G01S 7/032 342/175 |
| 2015/0070204 | A1 * | 3/2015 | Shirakawa | G01S 7/354 342/90 |
| 2015/0201385 | A1 * | 7/2015 | Mercer | H04B 1/3838 455/452.1 |
| 2015/0226837 | A1 * | 8/2015 | Corcos | G01S 13/34 342/106 |
| 2015/0285906 | A1 * | 10/2015 | Hooper | G01S 7/412 342/21 |
| 2015/0338261 | A1 * | 11/2015 | Mueller | G01S 7/032 342/124 |
| 2015/0381269 | A1 * | 12/2015 | Deyle | H04B 7/22 455/41.2 |
| 2016/0077196 | A1 * | 3/2016 | Dehlink | G01R 31/2822 342/169 |
| 2016/0109559 | A1 * | 4/2016 | Delbecq | G01S 13/34 342/170 |
| 2016/0131740 | A1 * | 5/2016 | Yoo | G01S 7/35 342/70 |
| 2016/0178730 | A1 | 6/2016 | Trotta et al. | |
| 2016/0282457 | A1 | 9/2016 | Mazzaro et al. | |
| 2016/0315628 | A1 * | 10/2016 | Mayer | G01S 7/35 |
| 2016/0327634 | A1 * | 11/2016 | Katz | G01S 7/411 |

(56) References Cited

U.S. PATENT DOCUMENTS

| | | | | |
|---|---|---|---|---|
| 2016/0377711 | A1* | 12/2016 | Arage | G01S 7/285 |
| | | | | 342/118 |
| 2017/0090014 | A1* | 3/2017 | Subburaj | G01S 13/931 |
| 2017/0149588 | A1 | 5/2017 | Yang et al. | |
| 2017/0153318 | A1* | 6/2017 | Melzer | G01S 7/4056 |
| 2018/0011181 | A1 | 1/2018 | Urakawa et al. | |
| 2018/0074168 | A1* | 3/2018 | Subburaj | G01S 7/038 |
| 2018/0074173 | A1* | 3/2018 | Trotta | G01S 13/343 |
| 2018/0188317 | A1* | 7/2018 | Maiellaro | G01R 31/2832 |
| 2019/0079179 | A1* | 3/2019 | Kitamura | G01S 7/02 |
| 2019/0257940 | A1* | 8/2019 | Sharonov | G01S 13/64 |
| 2019/0305859 | A1 | 10/2019 | Rimini | |

OTHER PUBLICATIONS

"Non-Final Office Action", U.S. Appl. No. 15/939,038, dated Sep. 4, 2018, 17 pages.

Partial International Search Report—PCT/US2018/024960—ISA/EPO—dated Jul. 3, 2018.

"Corrected Notice of Allowance", U.S. Appl. No. 15/939,038, dated Feb. 13, 2019, 6 pages.

"Notice of Allowance", U.S. Appl. No. 15/939,038, dated Jan. 7, 2019, 8 pages.

Ellinger F., et al., "Local Positioning for Wireless Sensor Networks", IEEE, Globecom Workshops, 2007, 6 Pages.

Yan L., et al., "An mmWave Wireless Communication and Radar Detection Integrated Network for Railways", IEEE Vehicular Technology Conference, 2016, 5 Pages.

\* cited by examiner

RANGE-BASED TRANSMISSION PARAMETER ADJUSTMENT

CROSS-REFERENCE TO RELATED APPLICATION(S)

This application claims the benefit of U.S. Provisional Application No. 62/477,933, filed 28 Mar. 2017, the disclosure of which is hereby incorporated by reference in its entirety herein.

TECHNICAL FIELD

This disclosure relates generally to wireless communications and, more specifically, to enabling a wireless transceiver to perform proximity detection to adjust transmission parameters for wireless communications.

BACKGROUND

Wireless networks may utilize high frequencies and small wavelengths to provide high data rates. In particular, fifth generation (5G)-capable devices communicate using frequencies at or near the extremely-high frequency (EHF) spectrum with wavelengths at or near millimeter wavelengths. Although higher-frequency signals provide larger bandwidths to efficiently communicate large amounts of data, these signals suffer from higher path loss (e.g., path attenuation). To compensate for the higher path loss, transmit power levels can be increased or beamforming can concentrate energy in a particular direction.

Accordingly, the Federal Communications Commission (FCC) has determined a maximum permitted exposure (MPE) limit. To meet targeted guidelines, devices are responsible for balancing performance with transmission power and other constraints. This balancing act can be challenging to achieve, especially with devices that have cost, size, and other considerations.

SUMMARY

An apparatus is disclosed that implements range-based transmission parameter adjustment. The described techniques use a wireless transceiver to perform both proximity detection and wireless communication. Local oscillator circuitry within the wireless transceiver generates one or more reference signals that enable proximity detection and wireless communication. The local oscillator circuitry can enable a frequency-modulated continuous wave signal or a multi-tone signal to be transmitted for proximity detection. By analyzing reflections from either of these signals, a range (e.g., distance) to an object and a material composition of the object can be determined. Based on these determinations, a transmission parameter that is used for wireless communication can be adjusted to enable the wireless transceiver to meet guidelines promulgated by the government or the wireless industry, such as a Maximum Permitted Exposure (MPE) limit as determined by the Federal Communications Commission (FCC). By actively measuring the range to the object, a surrounding environment can be continually monitored and the transmission parameter can be incrementally adjusted based on the range measurement to account for movement of the object.

In an example aspect, an apparatus is disclosed. The apparatus includes a first antenna, a second antenna, and a wireless transceiver. The wireless transceiver is coupled to the first antenna and the second antenna. The wireless transceiver is configured to transmit a proximity detection signal via the first antenna. The wireless transceiver is also configured to receive a reflected proximity detection signal via the second antenna. The reflected proximity detection signal including a portion of the proximity detection signal that is reflected by an object. The wireless transceiver is additionally configured to adjust a transmission parameter based on the reflected proximity detection signal. The transmission parameter varies according to a range to the object. The wireless transceiver is further configured to transmit an uplink signal using the transmission parameter.

In an example aspect, an apparatus is disclosed. The apparatus includes detection means for transmitting a proximity detection signal via a first antenna and receiving a reflected proximity detection signal via a second antenna. The reflected proximity detection signal including a portion of the proximity detection signal that is reflected by an object. The apparatus also includes adjustment means for adjusting a transmission parameter based on the reflected proximity detection signal. The transmission parameter varies according to a range to the object. The apparatus additionally includes communication means for transmitting an uplink signal using the transmission parameter.

In an example aspect, a method for range-based transmission parameter adjustment is disclosed. The method includes transmitting a proximity detection signal and receiving a reflected proximity detection signal. The reflected proximity detection signal including a portion of the proximity detection signal that is reflected by an object. The method also includes adjusting a transmission parameter based on the reflected proximity detection signal. The transmission parameter varies according to a range to the object. The method additionally includes transmitting an uplink signal using the adjusted transmission parameter.

In an example aspect, an apparatus is disclosed. The apparatus includes an antenna array, a first mixer coupled to the antenna array, a second mixer coupled to the antenna array, and local oscillator circuitry coupled to the first mixer and the second mixer. The local oscillator circuitry includes a frequency-modulated local oscillator, a local oscillator, and selection circuitry. The selection circuitry is coupled between the frequency-modulated local oscillator, the local oscillator, the first mixer, and the second mixer. The selection circuitry is configured to connect or disconnect the frequency-modulated local oscillator or the local oscillator to or from the first mixer and the second mixer.

DETAILED DESCRIPTION

An electronic device may use a high transmit power to compensate for path loss associated with millimeter wave (mmW) signals. Many of these electronic devices can be physically operated by a user. Such physical proximity presents opportunities for radiation to exceed a given guideline, such as a maximum permitted exposure (MPE) limit as determined by the Federal Communications Commission (FCC). Because of these issues, it is advantageous to enable devices to detect a proximity of the user.

Some proximity-detection techniques may use a dedicated sensor to detect the user, such as a camera, an infrared sensor, or a radar sensor. However, these sensors may be are bulky and expensive. Furthermore, a single electronic device can include multiple antennas that are positioned on different surfaces (e.g., on a top, a bottom, or opposite sides). To account for each of these antennas, multiple cameras or sensors may need to be installed near each of these antennas, which further increases a cost and size of the electronic device.

In contrast, techniques for range-based transmission parameter adjustment use a wireless transceiver to perform both proximity detection and wireless communication. Local oscillator circuitry within the wireless transceiver generates one or more reference signals that can enable both proximity detection and wireless communication. The local oscillator circuitry can enable a frequency-modulated continuous wave signal or a multi-tone signal to be transmitted for proximity detection. By analyzing reflections from either of these signals, a range (e.g., distance or slant range) to an object and a material composition of the object can be determined. Based on these determinations, a transmission parameter that is used for wireless communication can be adjusted to enable the wireless transceiver to meet guidelines promulgated by the government or the wireless industry, such as a Maximum Permitted Exposure (MPE) limit as determined by the Federal Communications Commission (FCC). By actively measuring the range to an object, a surrounding environment can be continually monitored and the transmission parameter can be incrementally adjusted to account for movement by the object.

Figure 1:
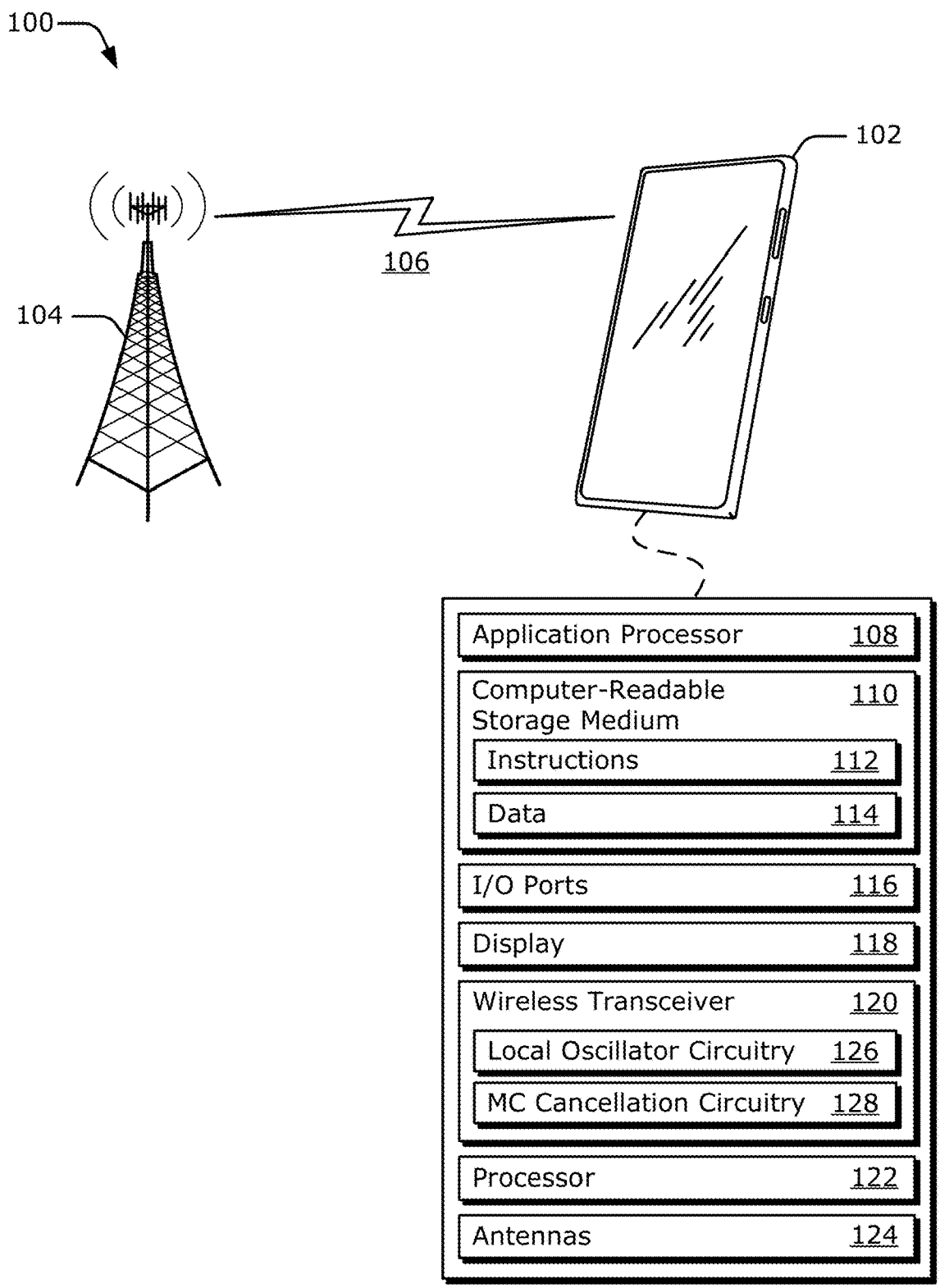
FIG. 1 illustrates an example computing device for range-based transmission parameter adjustment.

FIG. 1 illustrates an example computing device 102 for range-based transmission parameter adjustment. In an example environment 100, the computing device 102 communicates with a base station 104 through a wireless communication link 106 (wireless link 106). In this example, the computing device 102 is implemented as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, server, network-attached storage (NAS) device, smart appliance or other internet of things (IoT) device, medical device, vehicle-based communication system, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, cable television head-end, terrestrial television broadcast tower, access point, peer-to-peer device, mesh network node, small cell node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as 3rd Generation Partnership Project Long-Term Evolution (3GPP LTE), 5th Generation (5G), IEEE 802.11, IEEE 802.16, Bluetooth™, and so forth. In some implementations, instead of or in addition to providing a data link, the wireless link 106 may wirelessly provide power and the base station 104 may comprise a power source.

The computing device 102 includes an application processor 108 and a computer-readable storage medium 110 (CRM 110). The application processor 108 may include any type of processor (e.g., an application processor, a digital signal processor (DSP), or a multi-core processor), that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A wireless transceiver 120 of the computing device 102 provides connectivity to respective networks and other electronic devices connected therewith. Additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless LAN (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith.

The wireless transceiver 120 includes circuitry and logic for transmitting and receiving signals via antennas 124. Components of the wireless transceiver 120 can include amplifiers, mixers, switches, analog-to-digital converters, filters, and so forth for conditioning signals. The wireless transceiver 120 may also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains).

The wireless transceiver 120 also includes local oscillator circuitry 126 and mutual coupling (MC) cancellation circuitry 128. The local oscillator circuitry 126 produces one or more reference signals that are used for proximity detection and wireless communication. In this way, some components within the wireless transceiver 120 (e.g., mixers, amplifiers, or filters) can be utilized for both proximity detection and wireless communication. This can decrease cost and efficiently utilize available space within the wireless transceiver 120. The mutual coupling cancellation circuitry 128 cancels self-made interference (e.g., interference due to mutual coupling) to enable detection of weak reflections that are analyzed for proximity detection. The local oscillator circuitry 126 and the mutual coupling cancellation circuitry 128 can at least partially implement range-based transmission parameter adjustment, as described with reference to FIGS. 4 and 5.

The computing device 102 also includes a processor 122, which is coupled to the wireless transceiver 120. The processor 122, which may comprise a modem, can be implemented within or separate from the wireless transceiver 120. Although not explicitly shown, the processor 122 can include a portion of the CRM 110 or can access the CRM 110 to obtain computer-readable instructions. The processor 122 controls the wireless transceiver 120 and enables wireless communication or proximity detection to be performed. The processor 122 can include baseband circuitry to perform high-rate sampling processes that can include analog-to-digital conversion, digital-to-analog conversion, Fourier transforms, gain correction, skew correction, frequency translation, and so forth. The processor 122 can provide communication data to the wireless transceiver 120 for transmission. The processor 122 can also process a baseband version of a signal obtained from the wireless transceiver 120 to generate data, which can be provided to other parts of the computing device 102 via a communication interface for wireless communication or proximity detection.

Although not explicitly depicted, the wireless transceiver 120 or the processor 122 can also include a controller. The controller can include at least one processor and at least one CRM, such as the application processor 108 and the CRM 110. The CRM can store computer-executable instructions, such as the instructions 112. The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller can be implemented as part of the wireless transceiver 120, the processor 122, a special-purpose processor configured to perform MPE techniques, a general-purpose processor, some combination thereof, and so forth.

Figure 2:
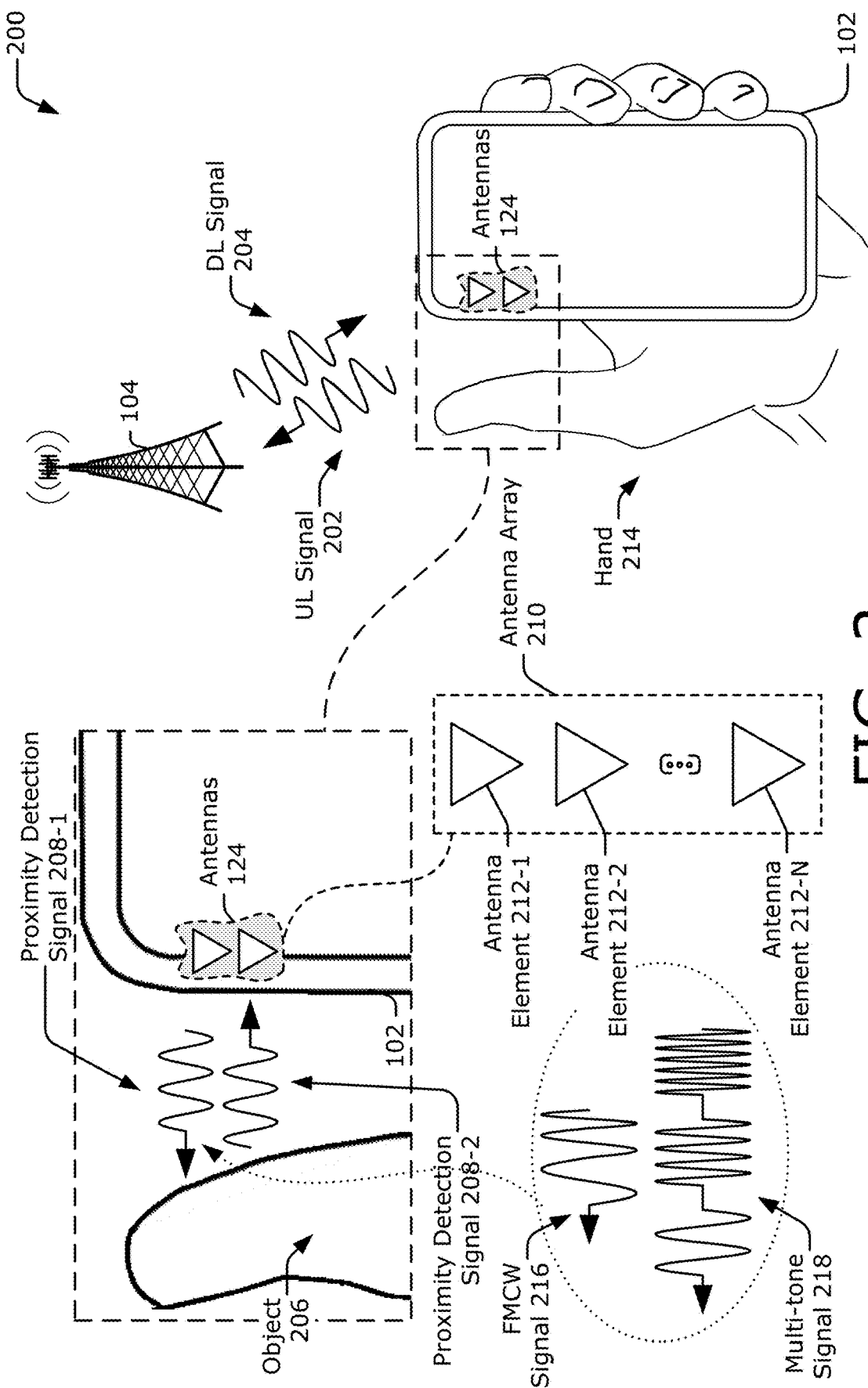
FIG. 2 illustrates an example operating environment for range-based transmission parameter adjustment.

FIG. 2 illustrates an example operating environment 200 for range-based transmission parameter adjustment. In the example environment 200, a hand 214 of a user holds the computing device 102. In one aspect, the computing device 102 communicates with the base station 104 by transmitting an uplink signal 202 (UL signal 202) or receiving a downlink signal 204 (DL signal 204) via at least one of the antennas 124. A user's thumb, however, may represent a proximate object 206 that may be exposed to radiation via the uplink signal 202. To determine a range to the object 206, the computing device 102 transmits a proximity detection signal 208-1 via at least one of the antennas 124 and receives a reflected proximity detection signal 208-2 via at least another one of the antennas 124.

In one implementation, the proximity detection signal 208-1 comprises a frequency-modulated continuous-wave (FMCW) signal 216. In general, a frequency of the FMCW signal 216 increases or decreases across a time interval. Different types of frequency modulations may be used, including linear-frequency modulations (LFM) (e.g., chirp), sawtooth-frequency modulations, triangular-frequency modulations, and so forth. The FMCW signal 216 enables radar-based ranging techniques to be utilized to determine the range to the object 206. To achieve a finer range resolution (e.g., on the order of centimeters (cm)) for close-range applications, larger bandwidths can be utilized, such as 1 gigahertz (GHz), 4 GHz, 8 GHz, and so forth. For instance, the FMCW signal 216 can have a bandwidth of approximately 4 GHz and include frequencies between approximately 26 and 30 GHz. The finer range resolution improves range accuracy and enables multiple objects 206 to be distinguished in range. Although generation of the FMCW signal 216 may utilize dedicated components within the local oscillator circuitry 126, the FMCW signal 216 can provide an accurate range measurement for a variety of distances based on the bandwidth (e.g., between approximately 4 and 20 cm for a 4 GHz bandwidth). The FMCW signal 216 also enables a composition of the object 206 to be directly measured. As such, the composition of the object 206 can be determined without the use of complex circuitry or an extensive calibration process. An amount of time for performing proximity detection can also be relatively short using the FMCW signal 216, such as within approximately one microsecond.

In another implementation, the proximity detection signal 208 is a multi-tone signal 218, which includes at least three tones (e.g., frequencies). The multi-tone signal 218 can be generated using existing components within the wireless transceiver 120, which are also used to generate the uplink signal 202. For example, the multi-tone signal 218 can be generated using an existing phase lock loop (PLL), using Orthogonal Frequency-Division Multiplexing (OFDM), or using a multi-tone transmit signal generated at baseband via a digital signal generator. Depending on the technique used, an amount of time for performing proximity detection via the multi-tone signal 218 can be on the order of approximately one microsecond and 400 microseconds. Frequency separations between the tones can be on the order of megahertz (MHz) or GHz. A bandwidth of the multi-tone signal 218 can be, for example, approximately 800 MHz or 2 GHz. The range to the object 206 is determined by analyzing a change in phase across each of these tones. To improve range accuracy, larger bandwidths (e.g., separations between tones) or larger quantities of tones can be used. The multi-tone signal 218 can be used to measure ranges between approximately 0 and 7 cm. To determine the composition of the object 206, the multi-tone signal 218 can also be used to indirectly determine the reflection coefficient based on a calibration process.

In some computing devices 102, the antennas 124 may comprise at least two different antennas, at least two antenna elements 212 of an antenna array 210, at least two antenna elements 212 associated with different antenna arrays 210, or any combination thereof. As shown in FIG. 2, the antennas 124 correspond to the antenna elements 212 within the antenna array 210, which can include multiple antenna elements 212-1 to 212-N, where N represents a positive integer. Using at least one of the antenna elements 212, the wireless transceiver 120 can transmit the proximity detection signal 208-1 while receiving the reflected proximity detection signal 208-2 using at least another one of the antenna elements 212. In other words, the wireless transceiver 120 can receive the reflected proximity detection signal 208-2 via a first antenna element 212-1 during a portion of time that the proximity detection signal 208-1 is transmitted via a second antenna element 212-2. The antennas 124 and/or elements thereof may be implemented using any type of antenna, including patch antennas, dipole antennas, and so forth.

If the computing device 102 includes multiple antennas 124 located on different sides of the computing device 102 (e.g., a top, a bottom, or opposite sides), the described techniques enable the user to be detected with respect to each antenna 124. In this way, transmission parameters can be independently adjusted relative to the range of the object 206 with respect to each antenna 124. Such independent detection therefore enables the two or more of the antennas 124 to be configured for different purposes. For example, one of the antennas 124 can be configured for enhanced communication performance while another one of the antennas 124 is simultaneously configured to comply with FCC requirements. As described in further detail with respect to FIG. 3, some of the components of the wireless transceiver 120 can be utilized for both wireless communication and proximity detection.

Figure 3:
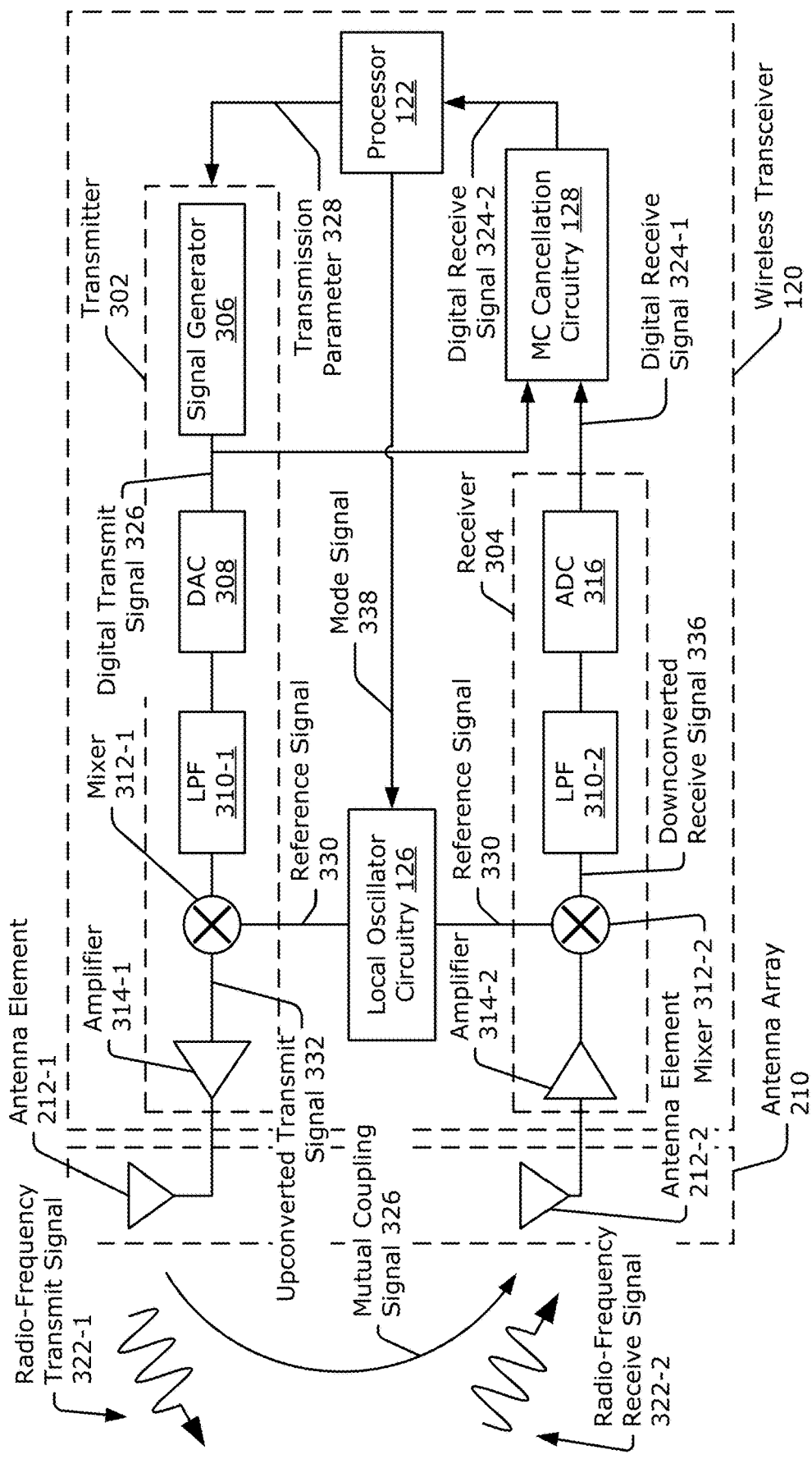
FIG. 3 illustrates an example implementation of a wireless transceiver and a processor for range-based transmission parameter adjustment.

FIG. 3 illustrates an example implementation of the wireless transceiver 120 and the processor 122 for range-based transmission parameter adjustment. The wireless transceiver 120 includes a transmitter 302 and a receiver 304, which are respectively coupled between the processor 122 and the antenna array 210. The transmitter 302 is shown to include a signal generator 306, a digital-to-analog converter (DAC) 308, a filter 310-1 (e.g., low-pass filter (LPF)), a mixer 312-1, and an amplifier 314-1. The receiver 304 is shown to include an amplifier 314-2 (such as a low-noise amplifier), a mixer 312-2, a filter 310-2 (e.g., a LPF), and an analog-to-digital converter (ADC) 316. The local oscillator circuitry 126 is coupled to the mixers 312-1 and 312-2. The local oscillator circuitry 126 generates at least one reference signal 330, which enables the mixers 312-1 and 312-2 to upconvert or downconvert analog signals within the transmit or receive chains, respectively. The local oscillator circuitry 126 can also generate one or more different types of reference signals 330 to support both proximity detection and wireless communication. The mutual coupling cancellation circuitry 128 is coupled to the transmitter 302, the receiver 304, and the processor 122. The transmitter 302 and the receiver 304 can also include other additional components that are not depicted in FIG. 3. These additional components can include band-pass filters, additional mixers, switches, and so forth.

Using these components, the transmitter 302 generates a digital transmit signal 326 in a digital domain. The digital transmit signal 326 can include a single frequency signal to generate the FMCW signal 216 or multiple frequencies to generate the multi-tone signal 218. An upconverted transmit signal 332 is generated by the mixer 312-1 using the reference signal 330 that is provided by the local oscillator circuitry 126. In some cases, the reference signal 330 can include a frequency-modulated local oscillator signal to generate the FMCW signal 216. The reference signal 330 can also include a local oscillator signal to generate the multi-tone signal 218 or the uplink signal 202. The upconverted transmit signal 332 is used to produce a radio-frequency transmit signal 322-1.

The transmitter 302 transmits the radio-frequency transmit signal 322-1 via the antenna element 212-1 and the receiver 304 receives a radio-frequency receive signal 322-2 via the antenna element 212-2. The radio-frequency receive signal 322-2 can include a portion of the radio-frequency transmit signal 322-1 that is reflected by the object 206 (of FIG. 2). For proximity detection, the radio-frequency signals 322-1 and 322-2 can represent the proximity detection signals 208-1 and 208-2, respectively. For wireless communication, the radio-frequency signals 322-1 and 322-2 can represent the uplink signal 202 and the downlink signal 204, respectively.

The receiver 304 receives the radio-frequency receive signal 322-2 and generates a downconverted receive signal 336, which is derived from the radio-frequency receive signal 322-2. The downconverted receive signal 336 is generated by the mixer 312-2 using the reference signal 330. If the radio-frequency receive signal 322-2 includes a reflected FMCW signal 216, the reference signal 330 can include the frequency-modulated local oscillator signal that is provided to the mixer 312-1. In this way, the mixer 312-2 performs a demodulation operation that results in the downconverted receive signal 336 including a beat frequency, which is representative of a frequency offset between the radio-frequency transmit signal 322-1 and the radio-frequency receive signal 322-2. The local oscillator circuitry 126 can also provide the local oscillator signal as the reference signal 330 if the radio-frequency receive signal 322-2 includes a reflected multi-tone signal 218 or the downlink signal 204. The receiver 304 generates a digital receive signal 324-1, which is derived from the downconverted receive signal 336. In the depicted configuration, the digital receive signal 324-1 is derived from the downconverted receive signal 336 by filtering and digitizing the downconverted receive signal 336 via the low-pass filter 310-2 and the analog-to-digital converter 316, respectively.

In FIG. 3, the antenna elements 212-1 and 212-2 are co-located as part of the same antenna array 210 or are otherwise proximate to one another. Consequently, some of the radio-frequency transmit signal 322-1 can leak into the receiver 304 through the antenna element 212-2. Due to the cross-coupling between the antenna elements 212-1 and 212-2, the radio-frequency receive signal 322-2 also includes another portion of the radio-frequency transmit signal 322-1 (e.g., a mutual coupling component) that is not reflected by the object 206. This portion is shown by a mutual coupling signal 326. The mutual coupling cancellation circuitry 128 obtains the digital receive signal 324-1 and removes the mutual coupling component to produce the digital receive signal 324-2. To remove the mutual coupling component from the digital receive signal 324-1, the mutual coupling cancellation circuitry 128 uses the digital transmit signal 326 to cancel the mutual coupling component. Although not explicitly shown, the mutual coupling cancellation can be performed in a time domain or a frequency domain via the mutual coupling cancellation circuitry 128.

The processor 122 obtains the receive signal 324-2 to perform proximity detection or wireless communication. For proximity detection, the processor 122 determines the range to the object 206 or the composition of the object 206 based on the digital receive signal 324-2. Based on this information, the processor 122 can generate a transmission parameter 328 that controls one or more transmission attributes for wireless communication. By specifying the transmission parameter 328, the processor 122 can, for example, cause the transmitter 302 to decrease power if an object 206 is near the computing device 102 or increase power if the object 206 is farther away from the computing device 102. If the composition of the object 206 is determined to not comprise human tissue, the processor 122 can, for example, keep the transmission parameter unchanged. The transmission parameter 328 can adjust a power level, a beam steering angle, a frequency, a selected antenna or antenna array, or a communication protocol that is used to transmit the uplink signal 202. The ability to determine the range to the object 206 or the composition of the object 206, and to control the transmitter 302 enables the processor 122 to balance performance of the computing device 102 with compliance or radiation requirements.

The processor 122 is also coupled to the local oscillator circuitry 126, which enables the processor 122 to control the local oscillator circuitry 126 via a mode signal 338. The mode signal 338, for example, can cause the local oscillator circuitry 126 to switch between generating reference signals for proximity detection or generating reference signals for wireless communication. In other implementations, the application processor 108 can perform one or more of these functions.

Although the wireless transceiver 120 is shown as a direct-conversion transceiver in FIG. 3, the described techniques can also be applied to other types of transceivers, such as superheterodyne transceivers. In general, the local oscillator circuitry 126 can be used to perform frequency conversion between any frequency stage (e.g., between baseband frequencies and radio frequencies, between intermediate frequencies and radio frequencies, or between baseband frequencies and intermediate frequencies). The local oscillator circuitry 126 and the mutual coupling cancellation circuitry 128 are further described with respect to FIGS. 4 and 5.

Figure 4:
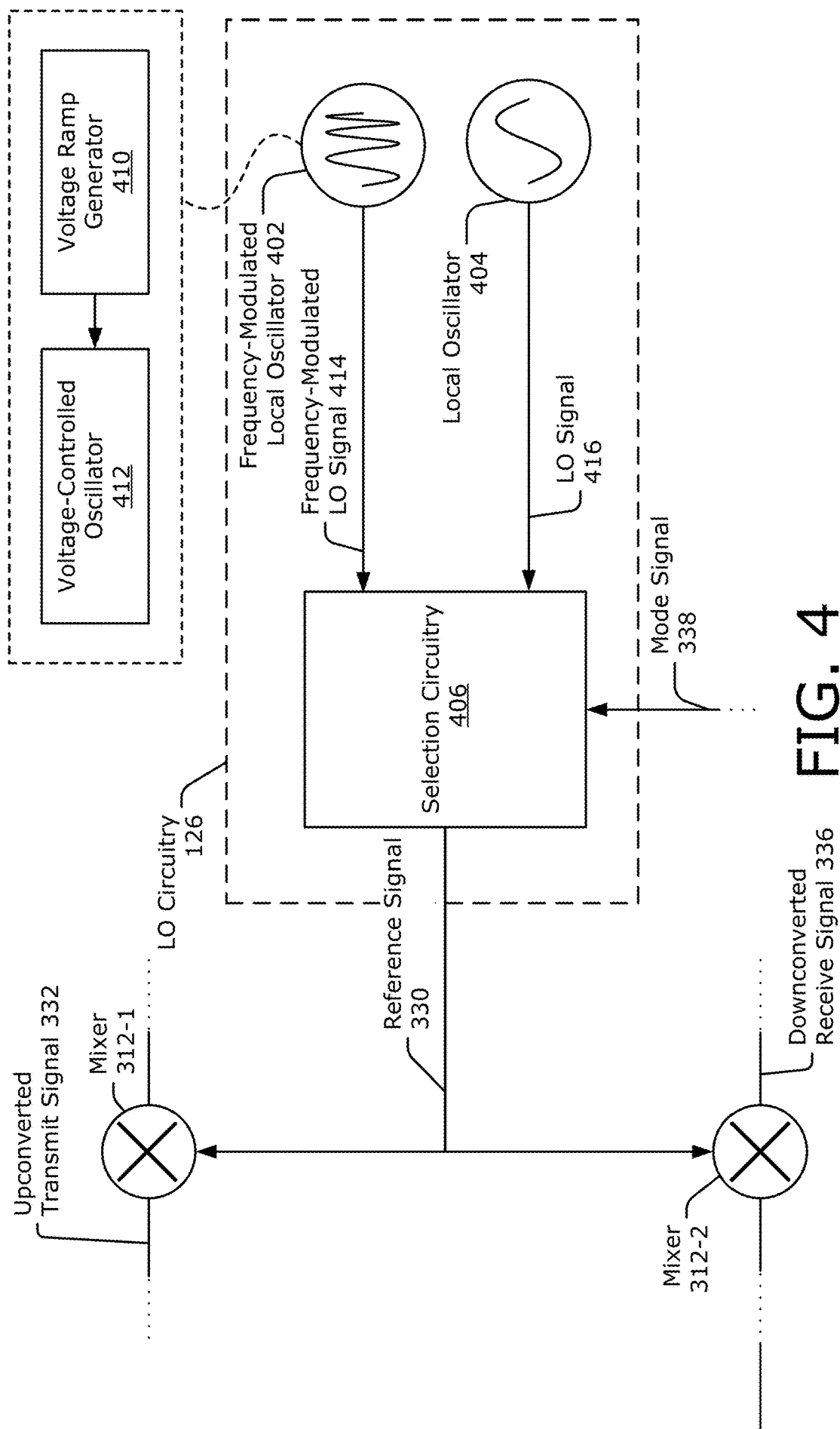
FIG. 4 illustrates example local oscillator circuitry for range-based transmission parameter adjustment.

FIG. 4 illustrates example local oscillator circuitry 126 for range-based transmission parameter adjustment. In the depicted configuration, the local oscillator circuity 126 includes a frequency-modulated local oscillator 402, a local oscillator 404, and selection circuitry 406. The frequency-modulated local oscillator 402 can be implemented using a voltage ramp generator 410 and a voltage-controlled oscillator 412. As an example, the voltage-controlled oscillator 412 can be implemented using a wideband open-loop voltage-controlled oscillator. By controlling an input voltage to the voltage-controlled oscillator 412, the voltage ramp generator 410 can provide a variety of different voltage ramps to enable the voltage-controlled oscillator 412 to generate a variety of different frequency-modulated local oscillator signals 414 (e.g., a linear-frequency modulated (LFM) signal, a sawtooth-frequency modulated signal, a triangular-frequency modulated signal, and so forth).

The local oscillator 404 can include, for example, a quartz crystal, an inductor-capacitor (LC) oscillator, an oscillator transistor (e.g., a metal-oxide semiconductor field-effective transistor (MOSFET), a transmission line, a diode, a piezoelectric oscillator, and so forth. A configuration of the local oscillator 404 can enable a target phase noise and quality factor to be achieved for wireless communication. In general, the local oscillator 404 generates a local oscillator signal 416 with a steady (e.g., constant) frequency. Although not explicitly shown, the local oscillator circuitry 126 can also include a phase lock loop or automatic gain control circuit. Either of these components can be coupled to the local oscillator 404 to enable the local oscillator 404 to oscillate at a steady frequency.

The selection circuitry 406 can include a switch or a multiplexer that is controlled by the processor 122. Based on the mode signal 338, the selection circuitry 406 connects or disconnects the frequency-modulated local oscillator 402 or the local oscillator 404 to or from the mixers 312-1 and 312-2. If the mode signal 338 is indicative of the wireless transceiver 120 performing proximity detection via the FMCW signal 216 (of FIG. 2), the selection circuitry 406 connects the frequency-modulated local oscillator 402 to the mixers 312-1 and 312-2 to provide the frequency-modulated local oscillator signal 414 as the reference signal 330. Alternatively, if the mode signal 338 is indicative of the wireless transceiver 120 performing wireless communication via the uplink signal 202 or the downlink signal 204 (of FIG. 2), the selection circuitry 406 connects the local oscillator 404 to the mixers 312-1 and 312-2 to provide the local oscillator signal 416 as the reference signal 330. The selection circuitry 406 enables the wireless transceiver 120 to quickly transition between performing operations for proximity detection or wireless communication.

In some cases, the processor 122 can cause the wireless transceiver 120 to switch between transmitting the FMCW signal 216 or the multi-tone signal 218 for proximity detection. For example, the FMCW signal 216 can be used to detect the object 206 at farther ranges while the multi-tone signal 218 is used to detect the object at closer ranges. This can be advantageous in situations in which the object 206 moves closer than a minimum range that is detectable based on a bandwidth of the FMCW signal 216. Accordingly, the mode signal 338 can cause the selection circuitry 406 to switch from providing the frequency-modulated local oscillator signal 414 as the reference signal 330 to providing the local oscillator signal 416 as the reference signal 330 for a proximity detection operation.

Although the frequency-modulated local oscillator 402 and the selection circuitry 406 is shown in FIG. 4, other implementations of the local oscillator circuitry 126 may not include these components. In this case, the local oscillator 404 can provide the local oscillator signal 416 as the reference signal 330 for both proximity detection and wireless communication operations. Proximity detection can therefore be performed using the multi-tone signal 218 as the proximity detection signal 208. As such, the multi-tone signal 218 enables dual-use of the local oscillator 404 for both proximity detection and wireless communication, which can save space within the wireless transceiver 120.

Figure 5:
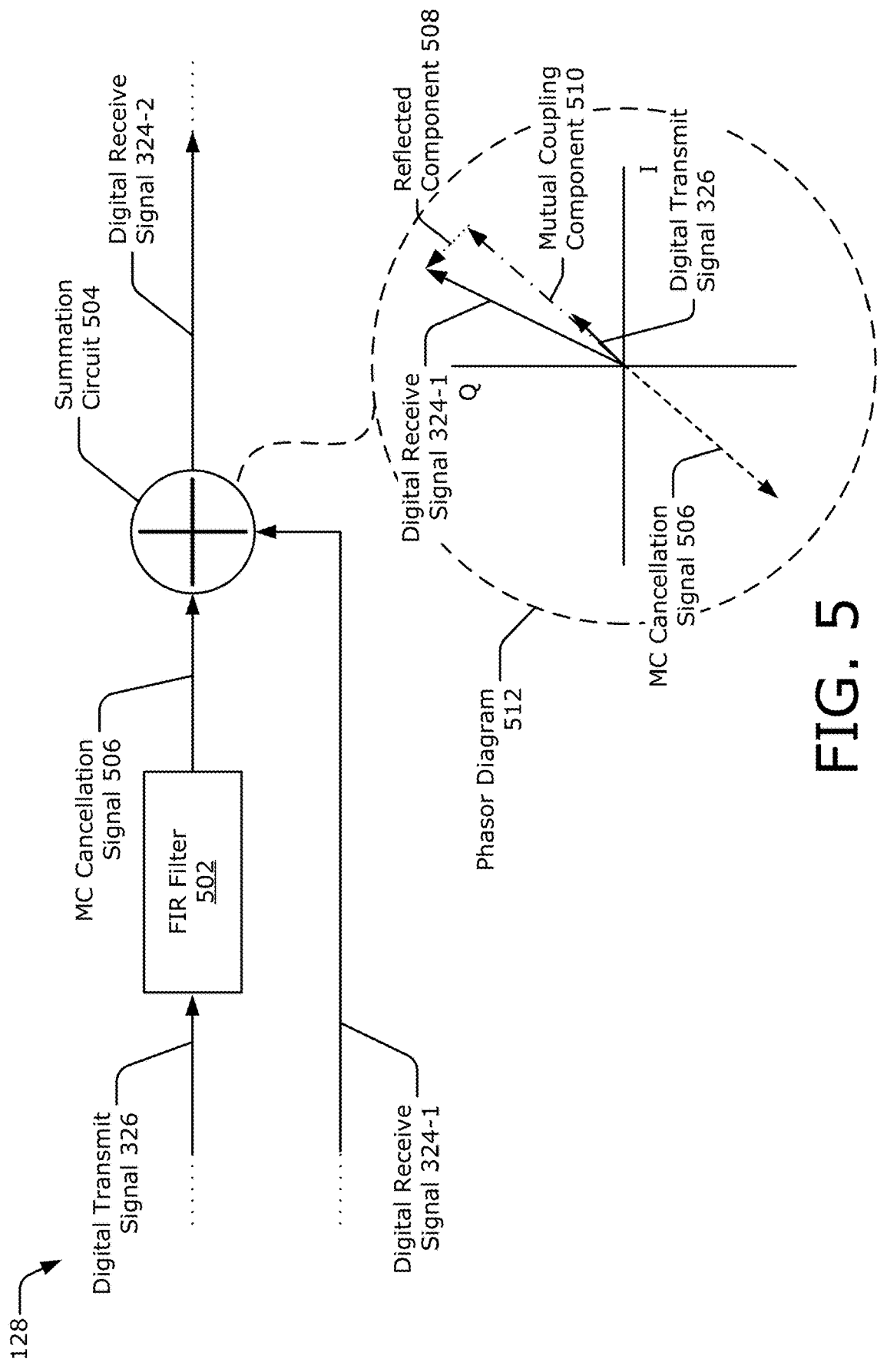
FIG. 5 illustrates example mutual coupling cancellation circuitry for range-based transmission parameter adjustment.

FIG. 5 illustrates example mutual coupling cancellation circuitry 128 for range-based transmission parameter adjustment. In the depicted configuration, the mutual coupling cancellation circuitry 128 includes a finite impulse response filter (FIR) 502 and a summation circuit 504. The finite impulse response filter 502 is coupled to the signal generator 306 of FIG. 3 and obtains the digital transmit signal 326. Based on the digital transmit signal 326, the finite impulse response filter 502 generates a mutual coupling cancellation signal 506.

The summation circuit 504 is coupled to the finite impulse response filter 502 and the analog-to-digital converter 316 of FIG. 3. The summation circuit 504 combines the mutual coupling cancellation signal 506 and the digital receive signal 324-1 to produce the digital receive signal 324-2. Together, the finite impulse response filter 502 and the summation circuit 504 jointly attenuate (e.g., remove, cancel, or reduce) a mutual coupling component 510 from the digital receive signal 324-1. The mutual coupling component 510 is present in the digital receive signal 324-1 due to the mutual coupling signal 326 of FIG. 3. To illustrate this cancellation, a phasor diagram 512 is shown in the bottom half of FIG. 5.

The phasor diagram 512 depicts phasors corresponding to the digital transmit signal 326, the digital receive signal 324-1, and the mutual coupling cancellation signal 506. The digital receive signal 324-1 includes a reflected component 508 and the mutual coupling component 510. The mutual coupling component 510 is generally a magnified and phase-shifted version of the digital transmit signal 326. The phase shift can occur due to a propagation distance between antenna elements 212 and can be on the order of approximately half a wavelength of the proximity detection signal 208-1. Using the digital transmit signal 326 and knowledge of a distance between the antenna elements 212 and a transmit power used to transmit the proximity detection signal 208-1, the finite impulse response filter 502 is configured to generate a mutual coupling cancellation signal 506 that is approximately equal in magnitude and 180 degrees out-of-phase with respect to the mutual coupling component 510. Consequently, the mutual coupling cancellation signal 506 cancels (e.g., attenuates) the mutual coupling component 510 when the digital receive signal 324-1 and the mutual coupling cancellation signal 506 are combined via the summation circuit 504.

In this way, the mutual coupling cancellation circuitry 128 enables the digital receive signal 324-2 to substantially include the reflected component 508 while omitting other components like the mutual coupling component 510. This reflected component 508 contains information about the object 206 and enables the processor 122 to determine the range to the object 206 or the composition of the object 206. This mutual coupling cancellation technique may be used for performing proximity detection via the FMCW signal 216 or via the multi-tone signal 218. In some cases, the mutual coupling cancellation circuitry 128 can remove the mutual coupling component 510 in a frequency domain and keep track of a frequency of the mutual coupling component 510. The mutual coupling cancellation circuitry 128 can also adjust the finite impulse response filter 502 to ensure that the mutual coupling component 510 is filtered. This may be beneficial as the mutual coupling component 510 can experience small changes in frequency over time. In some implementations, the components or functions of the mutual coupling cancellation circuitry 128 illustrated in FIG. 5 may be included in the processor 122 or the application processor 108.

Figure 6:
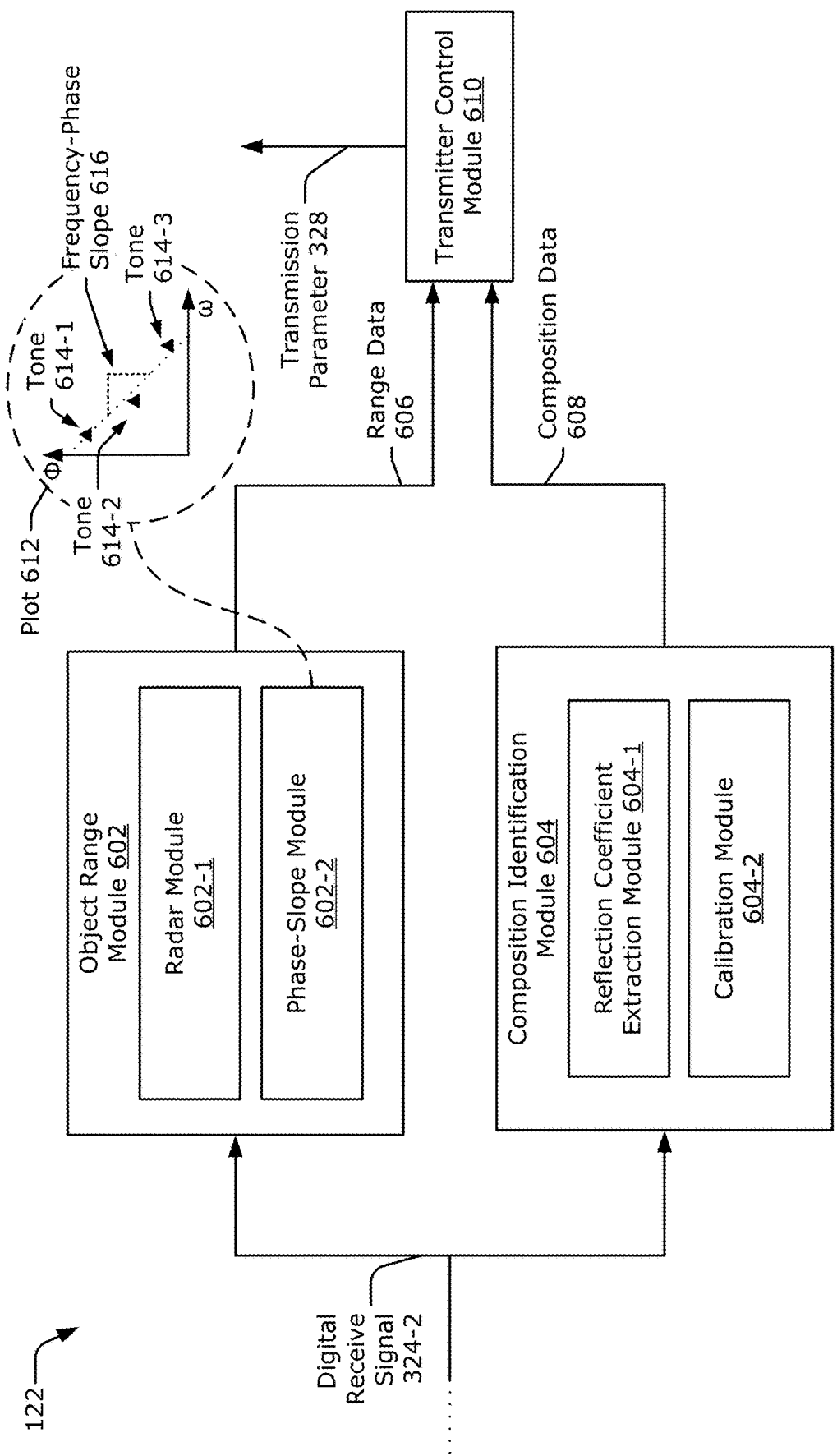
FIG. 6 illustrates an example scheme implemented by a processor for range-based transmission parameter adjustment.

FIG. 6 illustrates an example scheme implemented by the processor 122 for range-based transmission parameter adjustment. In the example scheme, the processor 122 performs operations associated with an object range module 602, a composition identification module 604, and a transmitter control module 610. The object range module 602 analyzes the digital receive signal 324-2 to produce range data 606. The range data 606 includes a measured range to the object 206. Using the described techniques, the range to the object 206 can be measured in, for instance, units of centimeters.

The composition identification module 604 analyzes the digital receive signal 324-2 to produce composition data 608, which describes a material composition of the object 206. For example, if the object 206 includes an appendage of a user, the composition data 608 can indicate that the object 206 comprises human tissue. Alternatively, if the object 206 is a desk or a wall, the composition data 608 can indicate that the object 206 comprises inanimate material, such as wood or metal.

The transmitter control module 610 obtains the range data 606 or the composition data 608. Based on this data, the transmitter control module 610 generates the transmission parameter 328. As described above with respect to FIG. 3, the transmission parameter 328 is used to control the transmitter 302. In particular, the transmission parameter 328 can be used to control transmission of the uplink signal 202 to enable the wireless transceiver 120 to meet guidelines promulgated by the government or the wireless industry. In some cases, the transmitter control module 610 may adjust a previously-used transmission parameter 328 based on recently-obtained range data 606 or composition data 608. In this way, the transmitter control module 610 can incrementally adjust the transmission parameter 328 as the object 206 moves towards or away from the computing device 102 or as new objects 206 are detected.

Based on the type of proximity detection signal 208 that is transmitted and received, the object range module 602 can implement a radar module 602-1 or a phase-slope module 602-2 to generate the range data 606. If the proximity detection signal 208 comprises the FMCW signal 216, the radar module 602-1 is used. Alternatively, if the proximity detection signal 208 comprises the multi-tone signal 218, the phase-slope module 602-2 is used.

The radar module 602-1 detects the object 206 and determines the range to the object 206 using radar-based detection and ranging techniques. For example, the radar module 602-1 can perform a Fast-Fourier Transform (FFT) operation on the digital receive signal 324-2 and determine that the object 206 is detected if a magnitude of the digital receive signal 324-2 exceeds a threshold setting. The threshold setting can be set using a Neyman-Pearson algorithm or based on a target false-alarm rate. The radar module 602-1 can compute the range to the object based on the beat frequency that is present in the digital receive signal 324-2. In general, the range to the object is proportional to a ratio of the beat frequency over a rate of change of a carrier frequency (e.g., a slope of the frequency ramp used to generate the frequency-modulated local oscillator signal 414).

The phase-slope module 602-2 detects the object 206 and determines the range to the object 206 based on a frequency-phase slope of the digital receive signal 324-2. As shown in a plot 612 at the upper-right corner of FIG. 6, three tones 614-1, 614-2, and 614-3 have respective frequencies ($\omega$) and phases ($\phi$). Accordingly, the phase-slope module 602-2 uses a linear regression, least-square regression, or some other estimation technique to analyze the relationship between the frequencies and phases of the tones 614 and measure the frequency-phase slope 616. Because the frequency-phase slope 616 is proportional to the range to the object 206, measuring the frequency-phase slope 616 enables the range to the object 206 to be determined. Although three example tones 614 are shown in FIG. 6, this technique can be applied to more than three tones 614 to increase range measurement accuracy.

Similar to the object range module 602, the composition identification module 604 can implement a reflection coefficient extraction module 604-1 or a calibration module 604-2 to generate the composition data 608 based on the type of proximity detection signal 208 that is transmitted and received. If the proximity detection signal 208 comprises the FMCW signal 216, the reflection coefficient extraction module 604-1 is used. Alternatively, if the proximity detection signal 208 comprises the multi-tone signal 218, the calibration module 604-2 is used.

The reflection coefficient extraction module 604-1 determines the composition of the object 206 by extracting a reflection coefficient from the digital receive signal 324-2. In general, the digital receive signal is represented by Equation 1 below:

$$x(n) = h_R e^{j2\pi \angle \Gamma} |\Gamma|^{j2\pi(-2KT_R)n} \qquad \text{Equation 1}$$

where $\Gamma$ is the reflection coefficient, $\angle\Gamma$ is a phase of the reflection coefficient, $|\Gamma|$ is a magnitude of the reflection coefficient, K is a frequency-slope of the FMCW signal 216, $T_R$ is the round-trip time determined via the radar module 602-1, n is a discrete time interval, and $h_R$ is a channel coefficient. To determine the reflection coefficient, the reflection coefficient extraction module 604-1 removes the channel coefficient. The channel coefficient can be determined based on Equation 2 below:

$$h_R = e^{-jw_o T_R} e^{-j2\pi K T_R^2} \qquad \text{Equation 2}$$

To remove the channel coefficient, the reflection coefficient extraction module 604-1 can multiply the digital receive signal 324-2 by a complex conjugate of the channel coefficient. After removing the channel coefficient, the phase of the reflection coefficient is extracted by taking the argument of the remaining signal. Based on the phase of the reflection coefficient, the composition of the object 206 can be identified.

To identify the composition of the object 206, the reflection coefficient extraction module 604-1, for example, can compare the phase of the reflection coefficient to a known reflection coefficient of human tissue. The reflection coefficient extraction module 604-1 can also utilize classification algorithms, machine learning techniques, or a database of known compositions to determine whether the reflection coefficient corresponds to human tissue or an inanimate object (e.g., metal or wood). The FMCW signal 216 enables the reflection coefficient to be directly extracted, without performing costly, time-intensive, or complex calibration processes.

Alternatively, the calibration module 604-2 can be used to generate the composition data 608 based on the multi-tone signal 218. In this case, the reflection coefficient of the object cannot be directly measured, as described with respect to the reflection coefficient extraction module 604-1. Instead, the calibration module 604-2 references calibration data to distinguish between objects of various compositions. The calibration process can involve, for example, measuring the digital receive signal 324-2 for a finger that is positioned at various distances, such as one, three, and five centimeters from the antennas 124 and use these measurements to compare with a later-collected digital receive signal 324-2. The calibration process can also collect the digital receive signals 324-2 over a variety of different transmission frequencies that may be used to generate the multi-tone signal 218. In some implementations, the components or functions of the processor 122 illustrated in FIG. 6 may be included in the application processor 108. In this case, the digital receive signal 324-2 is provided to the application processor 108.

Figure 7:
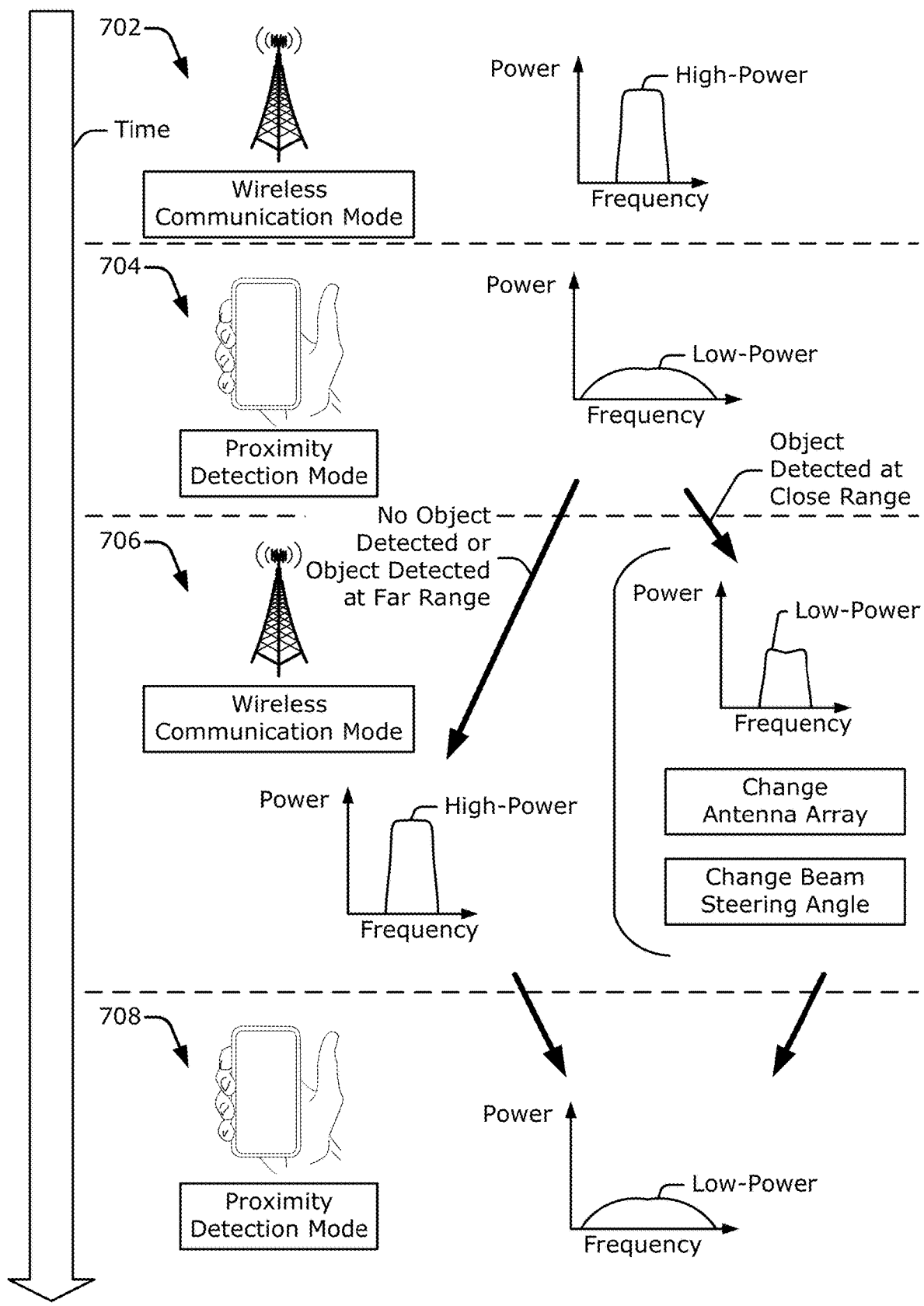
FIG. 7 illustrates an example sequence flow diagram for using range-based transmission parameter adjustment.

FIG. 7 illustrates an example sequence flow diagram for using range-based transmission parameter adjustment, with time elapsing in a downward direction. Examples of a wireless communication mode are shown at 702 and 706, and examples of a proximity detection mode are shown at 704 and 708. At 702, the wireless transceiver 120 transmits a high-power (e.g., normal) uplink signal 202 (of FIG. 2) configured to provide sufficient range. After transmitting the uplink signal 202, the proximity detection signal 208-1 is generated via the wireless transceiver 120 at 704. As described above, the proximity detection signal 208-1 enables the computing device 102 to detect an object 206 and determine the range to the object 206 or the composition of the object 206. In this case, the proximity detection signal 208-1 is represented by as a low-power wideband signal. The proximity detection signal 208-1 may comprise the frequency-modulated continuous-wave signal 216 or the multi-tone signal 218 of FIG. 2. Based on the detection, the transmitter control module 610 can generate the transmission parameter 328 (e.g., both of FIG. 6). In some implementations, the transmission parameter 328 can be generated for a next uplink signal 202 to account for MPE compliance guidelines. For example, if the object 206 is detected, the transmitter control module 610 can decrease the transmit power for the next uplink signal 202. Alternatively, if the object 206 is not detected, the transmitter control module 610 can keep the transmit power unchanged. In other implementations, the transmission parameter 328 can specify transmission of another proximity detection signal 208-1 by specifying another antenna or a different transmit power level of a next proximity detection signal 208-1.

The proximity detection mode can also determine the range to the object 206, thereby enabling the transmission parameter 328 to comply with range-dependent guidelines. An example range-dependent guideline includes a maximum power density. Power density is proportional to transmit power and inversely proportional to range. Accordingly, for a same transmit power level, an object 206 at a closer range is exposed to a higher power density compared to another object 206 at a farther range. Therefore, a similar power density at the object 206 can be achieved by increasing the transmit power level if the object 206 is at a farther range and decreasing the transmit power level if the object 206 is at a closer range. In this way, the transmission parameter 328 can be adjusted to enable the power density at the object 206 for both the closer range and the farther range to be below the maximum power density. At the same time, because the range is known, the transmit power level can be increased to a level that facilitates wireless communications and comports with the compliance guideline.

At 706, the wireless transceiver 120 transmits the next uplink signal 202 using the transmission parameter 328 generated by the transmitter control module 610. In the depicted example, a high-power uplink signal 202 is transmitted if an object 206 is not detected or the object 206 is detected at a far range. Alternatively, a low-power uplink signal 202 is transmitted if the object 206 is detected at a close range. The low-power can be, for example, between approximately five and twenty decibel-milliwatts (dBm) smaller than the high-power signal at 702. In addition to or instead of changing a power of the next uplink signal 202, the transmission parameter 328 can specify a different antenna or a different beam steering angle for transmitting the next uplink signal 202 (e.g., different than the antennas 124 or the beam steering angle used for transmitting the high-power signal at 702).

At 708, the wireless transceiver 120 generates another proximity detection signal 208 to attempt to detect the object 206. By scheduling multiple proximity detection signals 208 over some time period, the wireless transceiver 120 can dynamically adjust the transmission parameter 328 based on a changing environment. In some cases, the proximity detection signal 208 can be generated and sensed between active data cycles that occur during wireless communication or during predetermined times set by the processor 122. By actively monitoring the environment, the wireless transceiver 120 can appropriately adjust the transmission parameter 328 in real-time to balance communication performance with compliance or radiation requirements. The monitoring also enables the transmission parameter 328 to be incrementally adjusted to account for movement by the object 206. The sequence described above can also be applied to other antennas within the computing device 102. In some cases, the other antennas and the antennas 124 may generate proximity detection signals 208 at a same time or at different times.

Figure 8:
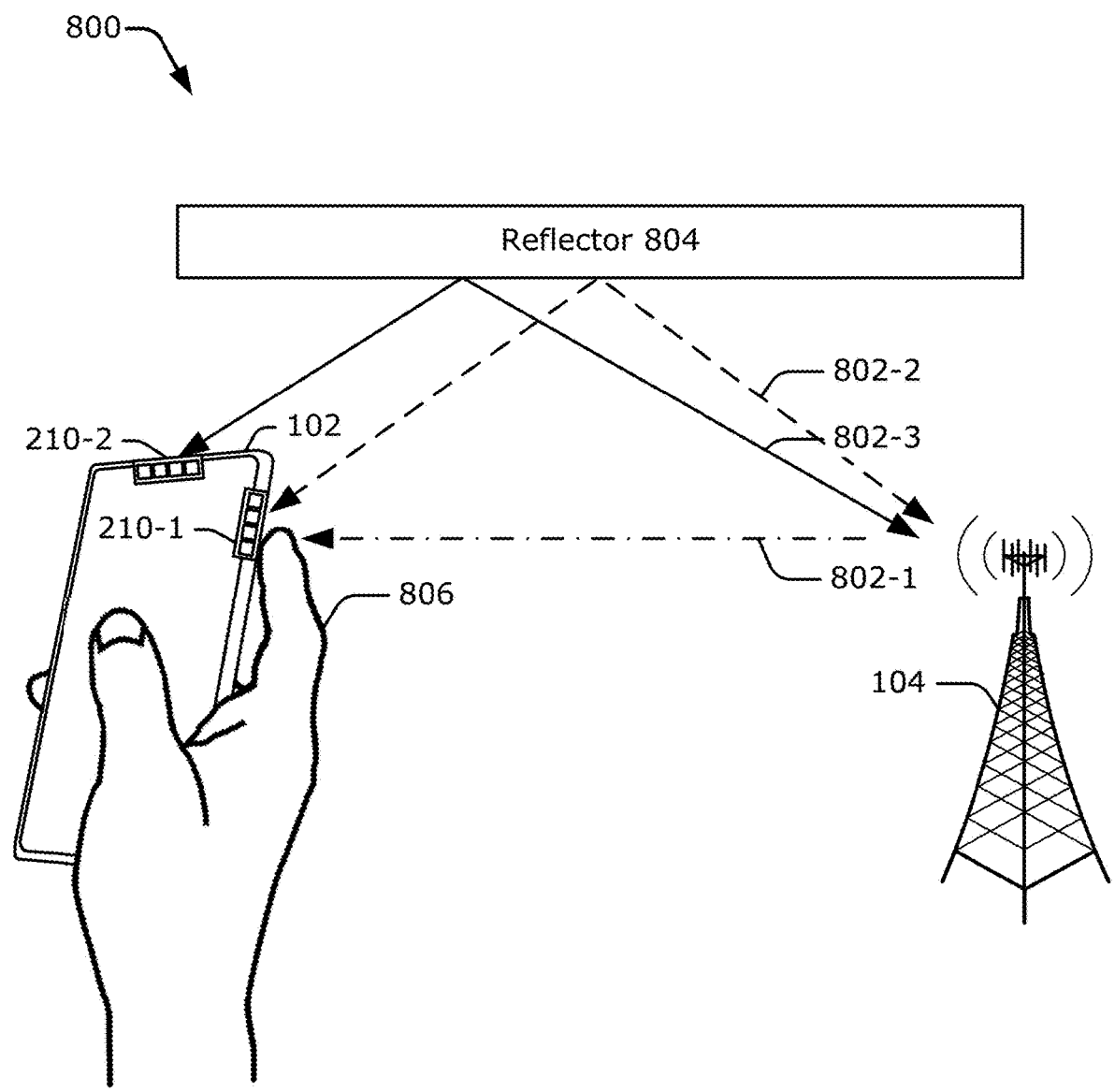
FIG. 8 illustrates example transmission adjustments that can be made in accordance with range-based transmission parameter adjustment.

FIG. 8 illustrates example transmission adjustments that are made in accordance with range-based transmission parameter adjustments. In FIG. 8, the computing device 102 includes antenna arrays 210-1 and 210-2. Through the antenna arrays 210-1 and 210-2, the computing device 102 can communicate with the base station 104 through multiple signal paths 802-1 to 802-3. A first signal path 802-1 represents a direct signal path between the antenna array 210-1 and the base station 104. A second signal path 802-2 represents an indirect signal path between the antenna array 210-1, a reflector 804, and the base station 104. A third signal path 802-3 represents an indirect signal path between the antenna array 210-2, the reflector 804, and the base station 104.

In the depicted environment, a finger 806 blocks the first signal path 802-1. Through proximity detection, the antenna array 210-1 can detect the finger 806. The transmitter control module 610 can generate transmission parameters 328 for the uplink signal 202 based on the detection. In some implementations, the transmission parameters 328 can ensure compliance by specifying a different beam steering angle that enables the uplink signal 202 to be transmitted via the antenna array 210-1 using the second signal path 802-2 instead of the first signal path 802-1. The beam steering angle can decrease radiation exposure at the finger 806 by directing a main-lobe of the uplink signal 202 away from the finger 806. Additionally or alternatively, a transmit power for the uplink signal 202 can be reduced for the second signal path 802-2 or the first signal path 802-1. In other implementations, the transmission parameters 328 can specify a different antenna array 210 for transmitting the communication signal. For example, the antenna array 210-2 can be used instead of the antenna array 210-1 to transmit the uplink signal 202 using the third signal path 802-3. By adjusting the transmission parameters 328, the computing device 102 can maintain communication with the base station 104 while ensuring compliance.

Figure 9:
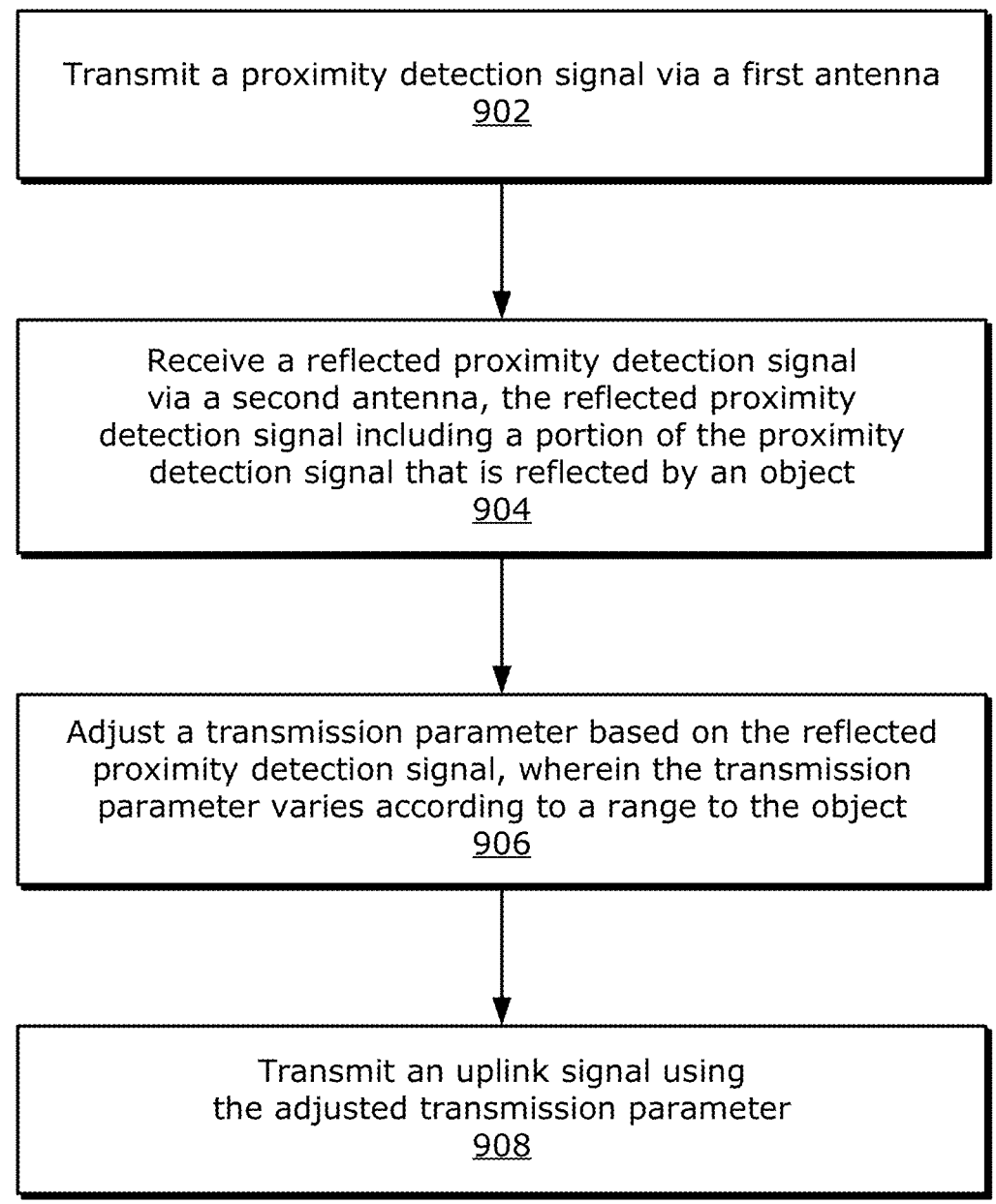
FIG. 9 is a flow diagram illustrating an example process for range-based transmission parameter adjustment.

FIG. 9 is a flow diagram illustrating an example process 900 for range-based transmission parameter adjustment. The process 900 is described in the form of a set of blocks 902-908 that specify operations that can be performed. However, operations are not necessarily limited to the order shown in FIG. 9 or described herein, for the operations may be implemented in alternative orders or in fully or partially overlapping manners. Operations represented by the illustrated blocks of the process 900 may be performed by a wireless transceiver 120 (e.g., of FIG. 1 or 3) or a processor 122 (e.g., of FIG. 1, 3, or 6). More specifically, the operations of the process 900 may be performed at least partially by local oscillator circuitry 126 as shown in FIGS. 3 and 4.

At block 902, a proximity detection signal is transmitted via a first antenna. For example, the wireless transceiver 120 can transmit the proximity detection signal 208-1 via one of the antennas 124 or antenna elements 212 of the antenna array 210 (of FIG. 2 or 3). In some cases, the proximity detection signal 208-1 comprises a frequency-modulated continuous wave (FMCW) signal 216, which can be generated using the frequency-modulated local oscillator 402 of FIG. 4. In other cases, the proximity detection signal 208-1 comprises the multi-tone signal 218, which can be generated using the local oscillator 404 of FIG. 4.

At block 904, a reflected proximity detection signal is received via a second antenna. The reflected proximity detection signal including a portion of the proximity detection signal that is reflected by an object. For example, the wireless transceiver 120 can receive the reflected proximity detection signal 208-2 via another one of the antennas 124 or antenna elements 212 of the antenna array 210. The proximity detection signal 208-2 includes a portion of the proximity detection signal 208-1 that is reflected by the object 206 (e.g., a reflected component 508 as shown in FIG. 5).

At block 906, a transmission parameter is adjusted based on the reflected proximity detection signal. The transmission parameter varies according to a range to the object. For example, the transmitter control module 610 can adjust the transmission parameter 328 based on the reflected proximity detection signal 208-2. The processor 122 can vary the transmission parameter 328 according to a range of the object 206. For instance, a transmit power level can be increased for greater ranges to the object 206 and decreased for smaller ranges to the object 206. Example transmission parameters 328 include a beam steering angle, a frequency, a communication protocol, a selected antenna or antenna array, a transmit power level, and so forth. In some cases, the transmission parameter 328 is incrementally adjusted as the object 206 moves towards or away from the computing device 102 over time.

At block 908, an uplink signal is transmitted using the adjusted transmission parameters. For example, the wireless transceiver 120 can transmit the uplink signal 202 of FIG. 2 via one or more of the antennas 124 using the transmission parameter 328. In this way, performance of the wireless transceiver 120 can be controlled to both enable wireless communication and MPE compliance.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:
1. An apparatus comprising:
a first antenna and a second antenna; and
a wireless transceiver coupled to the first antenna and the second antenna, the wireless transceiver configured to:
transmit a multi-tone signal via the first antenna, the multi-tone signal comprising at least three tones associated with different frequencies that are relatively constant;

receive a reflected multi-tone signal via the second antenna, the reflected multi-tone signal including a portion of the multi-tone signal that is reflected by an object;

adjust a transmission parameter based on a change in phase relative to a change in frequency across the at least three tones of the reflected multi-tone signal, wherein the transmission parameter varies according to a range to the object; and transmit an uplink signal using the transmission parameter.

2. The apparatus of claim 1, wherein the wireless transceiver is configured to:

transmit a frequency-modulated continuous-wave signal via the first antenna;

receive a reflected frequency-modulated continuous-wave signal via the second antenna, the reflected frequency-modulated continuous-wave signal including a portion of the frequency-modulated continuous-wave signal that is reflected by another object;

adjust another transmission parameter based on the reflected frequency-modulated continuous-wave signal, wherein the other transmission parameter varies according to the range to other object; and transmit another uplink signal using the other transmission parameter.

3. The apparatus of claim 2, wherein the wireless transceiver includes local oscillator circuitry configured to generate one or more reference signals associated with frequency-conversion operations within the wireless transceiver, the frequency-conversion operations associated with:

transmitting the multi-tone signal;
receiving the reflected multi-tone signal;
transmitting the uplink signal;
transmitting the frequency-modulated continuous-wave signal; and
receiving the reflected frequency-modulated continuous-wave signal.

4. The apparatus of claim 3, wherein:
the local oscillator circuitry includes:
a frequency-modulated local oscillator configured to generate a frequency-modulated local oscillator signal as one signal of the one or more reference signals, the frequency-modulated local oscillator signal associated with the transmitting of the frequency-modulated continuous-wave signal and the receiving of the reflected frequency-modulated continuous-wave signal; and
a local oscillator configured to generate a local oscillator signal as another signal of the one or more reference signals, the local oscillator signal associated with the transmitting of the multi-tone signal, the receiving of the reflected multi-tone signal, and the transmitting of the uplink signal, the local oscillator signal having a relatively constant frequency compared to the frequency-modulated local oscillator signal; and
a mixer that is selectively coupled to the frequency-modulated local oscillator or the local oscillator, the mixer configured to upconvert an input signal based on the frequency-modulated local oscillator signal or the local oscillator signal.

5. The apparatus of claim 4, wherein:
the wireless transceiver includes another mixer that is selectively coupled to the frequency-modulated local oscillator or the local oscillator, the other mixer configured to downconvert a receive signal based on the frequency-modulated local oscillator signal or the local oscillator signal.

6. The apparatus of claim 4, wherein:
the local oscillator circuitry includes selection circuitry; the selection circuitry coupled to the local oscillator, the frequency-modulated local oscillator, and the mixer; the selection circuitry configured to selectively connect the frequency-modulated local oscillator or the local oscillator to the mixer to provide the frequency-modulated local oscillator signal or the local oscillator signal to the mixer, respectively.

7. The apparatus of claim 2, wherein the wireless transceiver is configured to:

switch between transmitting the multi-tone signal or transmitting the frequency-modulated continuous-wave signal based on a target range for detecting the object.

8. The apparatus of claim 1, wherein the transmission parameter comprises at least one of the following:
a power level;
a beam steering angle;
a frequency;
a selected antenna; or
a communication protocol.

9. The apparatus of claim 1, further comprising an antenna array including a first antenna element and a second antenna element, wherein:
the first antenna comprises the first antenna element;
the second antenna comprises the second antenna element; and
the wireless transceiver is further configured to receive the reflected multi-tone signal via the second antenna element during a portion of time that the multi-tone signal is transmitted via the first antenna element.

10. The apparatus of claim 1, wherein the transmission parameter varies according to a composition of the object.

11. An apparatus comprising:
detection means for transmitting a multi-tone signal via a first antenna and receiving a reflected multi-tone signal via a second antenna, the reflected multi-tone signal including a portion of the multi-tone signal that is reflected by an object, the multi-tone signal comprising at least three tones associated with different frequencies that are relatively constant;
adjustment means for adjusting a transmission parameter based on a change in phase relative to a change in frequency across the at least three tones of the reflected multi-tone signal, wherein the transmission parameter varies according to a range to the object; and
communication means for transmitting an uplink signal using the transmission parameter.

12. The apparatus of claim 11, further comprising:
radar means for transmitting a frequency-modulated continuous-wave signal via the first antenna and receiving a reflected frequency-modulated continuous-wave signal via the second antenna, the reflected frequency-modulated continuous-wave signal including a portion of the frequency-modulated continuous-wave signal that is reflected by the object, wherein:
the adjustment means is configured to adjust another transmission parameter based on the reflected frequency-modulated continuous-wave signal, the other transmission parameter varying according to the range to the object; and the communication means is configured to transmit another uplink signal using the other transmission parameter.

13. The apparatus of claim 12, further comprising:
oscillation means for producing at least two reference signals that are associated with frequency-conversion operations performed via the radar means, the oscillation means including:
  frequency-modulation means for generating a frequency-modulated local oscillator signal as one signal of the at least two reference signals, the frequency-modulated local oscillator signal associated with both an upconversion operation and a downconversion operation performed via the detection means, the frequency-modulated local oscillator signal having a frequency that depends on time; and
  upconversion means for generating the frequency-modulated continuous-wave signal using the frequency-modulated local oscillator signal, the upconversion means coupled to the oscillation means.

14. The apparatus of claim 13, wherein the frequency-modulation means comprises ramp generation means for controlling a modulation of the frequency-modulated local oscillator signal.

15. The apparatus of claim 13, further comprising:
downconversion means for generating a downconverted receive signal using the frequency-modulated local oscillator signal, the downconversion means coupled to the oscillation means.

16. The apparatus of claim 15, wherein:
the downconverted receive signal includes a beat frequency representative of a frequency offset between the frequency-modulated continuous-wave signal and the reflected frequency-modulated continuous-wave signal; and
the adjustment means is configured to adjust the other transmission parameter based on the beat frequency.

17. The apparatus of claim 11, wherein the transmission parameter comprises at least one of the following:
a power level;
a beam steering angle;
a frequency;
a selected antenna; or
a communication protocol.

18. The apparatus of claim 11, further comprising:
oscillation means for producing at least one reference signal that is associated with frequency-conversion operations performed via the detection means and the communication means, the oscillation means including:
  local oscillation means for generating a local oscillator signal as one signal of the at least one reference signal, the local oscillator signal having a relatively constant frequency.

19. The apparatus of claim 18, further comprising upconversion means for generating the multi-tone signal and the uplink signal using the local oscillator signal.

20. A method for range-based transmission parameter adjustment, the method comprising:
transmitting a multi-tone signal via a first antenna, the multi-tone signal comprising at least three tones associated with different frequencies that are relatively constant;
receiving a reflected multi-tone signal via a second antenna, the reflected multi-tone signal including a portion of the multi-tone signal that is reflected by an object;
adjusting a transmission parameter based on a change in phase relative to a change in frequency across the at least three tones of the reflected multi-tone signal, wherein the transmission parameter varies according to a range to the object; and
transmitting an uplink signal using the adjusted transmission parameter.

21. The method of claim 20, further comprising:
transmitting a frequency-modulated continuous-wave signal via the first antenna;
receiving a reflected frequency-modulated continuous-wave signal via the second antenna, the reflected frequency-modulated continuous-wave signal including a portion of the frequency-modulated continuous-wave signal that is reflected by the object;
adjusting another transmission parameter based on the reflected frequency-modulated continuous-wave signal, wherein the other transmission parameter varies according to the range to the object; and
transmitting another uplink signal using the other transmission parameter.

22. The method of claim 21, further comprising:
generating a first local oscillator signal that upconverts the frequency-modulated continuous-wave signal and downconverts the reflected frequency-modulated continuous-wave signal, the first local oscillator signal comprising a frequency-modulated local oscillator signal having a frequency that depends on time;
downconverting the reflected frequency-modulated continuous-wave signal using the first local oscillator signal to produce a downconverted receive signal that includes a beat frequency; and
adjusting the transmission parameter based on the beat frequency.

23. The method of claim 22, further comprising:
generating a second local oscillator signal that upconverts the multi-tone signal and downconverts the reflected multi-tone signal, the second local oscillator signal having a relatively constant frequency.

24. The method of claim 23, further comprising upconverting the uplink signal using the second local oscillator signal.

25. An apparatus comprising:
an antenna array;
a first mixer coupled to a first antenna of the antenna array;
a second mixer coupled to a second antenna of the antenna array; and
local oscillator circuitry coupled to the first mixer and the second mixer, the local oscillator circuitry including:
  a frequency-modulated local oscillator configured to generate a frequency-modulated local oscillator signal having a frequency that varies over a time interval;
  a local oscillator configured to generate a local oscillator signal having a relatively constant frequency; and
  selection circuitry coupled between the frequency-modulated local oscillator, the local oscillator, the first mixer, and the second mixer, the selection circuitry configured to connect or disconnect the frequency-modulated local oscillator or the local oscillator to or from the first mixer and the second mixer.

26. The apparatus of claim 25, wherein:
the selection circuitry is configured to connect the frequency-modulated local oscillator to the first mixer and the second mixer;
the first mixer is configured to generate an upconverted transmit signal using the frequency-modulated local oscillator signal; and
the antenna array is configured to transmit a frequency-modulated continuous-wave signal, the frequency-modulated continuous-wave signal derived from the upconverted transmit signal.

27. The apparatus of claim 26, further comprising a processor, wherein:
the antenna array is configured to receive a reflected frequency-modulated continuous-wave signal, the reflected frequency-modulated continuous-wave signal including a portion of the frequency-modulated continuous-wave signal that is reflected by an object;
the second mixer is configured to generate a downconverted receive signal using the frequency-modulated local oscillator signal, the downconverted receive signal derived from the reflected frequency-modulated continuous-wave signal, the downconverted receive signal including a beat frequency that is representative of a frequency difference between the frequency-modulated continuous-wave signal and the reflected frequency-modulated continuous-wave signal; and
the processor is configured to adjust a transmission parameter based on the beat frequency, the transmission parameter varying according to a range to the object.

28. The apparatus of claim 27, further comprising an amplifier coupled between the first mixer and the antenna array, wherein:
the selection circuitry is configured to connect the local oscillator to the first mixer and the second mixer;
the first mixer is configured to generate another upconverted transmit signal using the local oscillator signal;
the antenna array is configured to transmit an uplink signal, the uplink signal derived from the other upconverted transmit signal;
the transmission parameter comprises a transmission power level; and
the amplifier is configured to provide amplification associated with the uplink signal based on the transmission power level.

29. The apparatus of claim 26, further comprising a signal generator configured to generate a digital signal that includes at least three tones, wherein:
the selection circuitry is configured to connect the local oscillator to the first mixer and the second mixer;
the first mixer is configured to generate an upconverted transmit signal using the local oscillator signal; and
the antenna array is configured to transmit a multi-tone signal, the multi-tone signal derived from the upconverted transmit signal.

30. The apparatus of claim 29, wherein the apparatus is configured to:
switch between transmitting the multi-tone signal or transmitting the frequency-modulated continuous-wave signal based on a target range for detecting an object.

* * * * *